(12) United States Patent
Bauduin et al.

(10) Patent No.: US 10,598,255 B2
(45) Date of Patent: Mar. 24, 2020

(54) SELF-CONTAINED REDUCTION GEAR WITH TWO RATIOS, AND SYSTEM WITH ENGINE AND REVERSIBLE ELECTRICAL MACHINE INCLUDING THIS REDUCTION GEAR

(71) Applicant: SAFRAN TRANSMISSIONS SYSTEMS, Colombes (FR)

(72) Inventors: Lionel Bauduin, Houilles (FR); Maxence Guillemont, Colombes (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 53 days.

(21) Appl. No.: 15/771,444

(22) PCT Filed: Nov. 2, 2016

(86) PCT No.: PCT/FR2016/052831
§ 371 (c)(1),
(2) Date: Apr. 27, 2018

(87) PCT Pub. No.: WO2017/077229
PCT Pub. Date: May 11, 2017

(65) Prior Publication Data
US 2018/0328454 A1 Nov. 15, 2018

(30) Foreign Application Priority Data
Nov. 3, 2015 (FR) ..................................... 15 60520

(51) Int. Cl.
*F16H 3/00* (2006.01)
*F02C 7/26* (2006.01)
(Continued)

(52) U.S. Cl.
CPC ............... *F16H 3/003* (2013.01); *F02C 7/26* (2013.01); *F02C 7/32* (2013.01); *F16H 3/06* (2013.01);
(Continued)

(58) Field of Classification Search
CPC .... F16H 3/003; F16H 3/06; F16H 2200/0034; F02C 7/32; F02C 7/26; F01D 15/10;
(Continued)

(56) References Cited

U.S. PATENT DOCUMENTS 1,032,168 A * 7/1912 Waterhouse ............... F16H 3/16
74/333
3,479,895 A * 11/1969 Wegener .................. B66D 1/24
74/333
(Continued)

FOREIGN PATENT DOCUMENTS

FR 687056 A 8/1930
FR 918931 A 2/1947
(Continued)

OTHER PUBLICATIONS

International Search Report dated Feb. 9, 2017 in PCT/FR2016/052831 filed Nov. 2, 2016.
(Continued)

*Primary Examiner* — Victor L MacArthur
(74) *Attorney, Agent, or Firm* — Oblon, McClelland, Maier & Neustadt, L.L.P.

(57) ABSTRACT

The reduction gear includes a pair of gears installed in parallel between two shafts and each provided with a mobile wheel free to move axially to engage in turn with one of the shafts and to transmit movement with different ratios. Since the gear teeth are helical, opposite forces on the reduction gear make it changeover from one reduction ratio to the other. No external control is necessary. Application to
(Continued)

mechanical transmissions between an engine and a reversible electrical machine (starter or generator), that starts the motor with a large speed reduction and generates electricity with a smaller reduction.

4 Claims, 2 Drawing Sheets

(51) Int. Cl.
*F16H 3/06* (2006.01)
*F02C 7/32* (2006.01)
*F01D 15/10* (2006.01)
*F02N 11/04* (2006.01)
*F02N 15/02* (2006.01)

(52) U.S. Cl.
CPC .............. *F01D 15/10* (2013.01); *F02N 11/04* (2013.01); *F02N 15/02* (2013.01); *F05D 2260/85* (2013.01); *F16H 2200/0034* (2013.01); *Y02T 50/671* (2013.01)

(58) Field of Classification Search
CPC ........ F02N 15/02; F02N 11/04; Y02T 50/671; F05D 2260/85

USPC .................................. 74/321, 333, 340, 352
See application file for complete search history.

(56) References Cited

U.S. PATENT DOCUMENTS

| | | | | |
|---|---|---|---|---|
| 8,448,771 | B2 * | 5/2013 | Kuwashima | ............ F16D 11/14 |
| | | | | 192/108 |
| 2012/0279334 | A1 * | 11/2012 | Gaully | ................... F02C 7/275 |
| | | | | 74/333 |

FOREIGN PATENT DOCUMENTS

| | | |
|---|---|---|
| FR | 1006678 A | 4/1952 |
| FR | 1077049 A | 11/1954 |

OTHER PUBLICATIONS

French Search Report dated Jun. 21, 2016 in FR 1560520 filed Nov. 3, 2015.

* cited by examiner

SELF-CONTAINED REDUCTION GEAR WITH TWO RATIOS, AND SYSTEM WITH ENGINE AND REVERSIBLE ELECTRICAL MACHINE INCLUDING THIS REDUCTION GEAR

BACKGROUND OF THE INVENTION

Field of the Invention

The subject of the invention is a self-contained reduction gear with two reduction ratios, and a system with an engine and reversible electrical machine in which this reduction gear is used.

A self-contained reduction gear refers to a reduction gear in which the reduction ratio can be changed without any external control, and a reversible electrical machine refers to a machine capable of converting mechanical energy into electrical energy, and vice versa.

Description of the Related Art

One application of the device is integration of an electrical machine that can be used as a starter and generator for an adjacent engine. The two starter and electricity generation functions are normally done by two different accessories for aircraft engines. The use of a single electrical machine would be desirable to reduce weight and to simplify the system. However, starting an engine requires a very high torque with low rotation speeds. This could be achieved by used a large electrical machine, but this would penalise the weight, the dimensions and the cost of the system. Another approach would be to have a transmission with a large reduction ratio between the electrical machine and the engine so that the engine can be started at a lower torque and a higher speed of the machine; but the speed of the machine when functioning as generator would be excessive, since the engine would be at a cruising speed much faster than the start up speed, and clearly excessive.

Patents FR 918 931 A and FR 1 077 049 A disclose devices in which helical gears are installed together between two parallel shafts, with mechanisms capable of selectively engaging them to modify the rotation ratio of the shafts.

BRIEF SUMMARY OF THE INVENTION

One aspect of the invention is a reduction gear that comprises two gears with different tooth reduction ratios, each gear having a first toothed wheel mounted on a single first shaft and a second toothed wheel mounted on a single second shaft, the first toothed wheels being mobile toothed wheels free to slide on the first shaft and both being provided with mesh relief with complementary relief on the first shaft, said relief of the mobile toothed wheels being present on a lateral side of the toothed wheels, the mobile toothed wheels being installed free to rotate on the first shaft but fixed in rotation with the first shaft at corresponding gear positions in which their relief engages with the relief on the first shaft, in which the teeth of the mobile toothed wheels are helical and have inclinations in the same tangential direction relative to the first shaft, the meshing positions extending between the mobile toothed wheels, characterised in that the first shaft carries a freely sliding spacer, that can come into contact with the two mobile toothed wheels simultaneously, keeping them at an distance that prevents the gear positions from being engaged simultaneously.

Another aspect of the invention is a system comprising a reversible electrical machine, an engine and a mechanical transmission system connecting two rotating shafts belonging to the electrical machine and to the engine, in which the mechanical transmission includes this reduction gear.

The changeover of the electrical machine from starter mode to generator mode, or vice versa, is accompanied in the reduction gear by an inversion of axial forces on the helical teeth, that are responsible for translation movements of mobile toothed wheels, with the effect of separating one of the gears while coupling the other gear. Therefore the result is to changeover two reduction ratios to impose operation of the electrical machine at suitable speeds both in the starter condition and in the generator condition. These changeovers are obtained automatically, without any external control, since state changes of the machine are accompanied by an inversion of the direction of axial forces in the helical teeth. This lack of external control is particularly appreciated.

The reliability of changeovers is increased particularly by use of the spacer, that prohibits accidental simultaneous engagements of gears that would destroy the device.

BRIEF DESCRIPTION OF THE SEVERAL VIEWS OF THE DRAWINGS

The different aspects, characteristics and advantages of the invention will now be described with reference to the following figures, appended purely for illustrative purposes, that represent a particular embodiment of the invention.

DETAILED DESCRIPTION OF THE INVENTION

Figure 1:
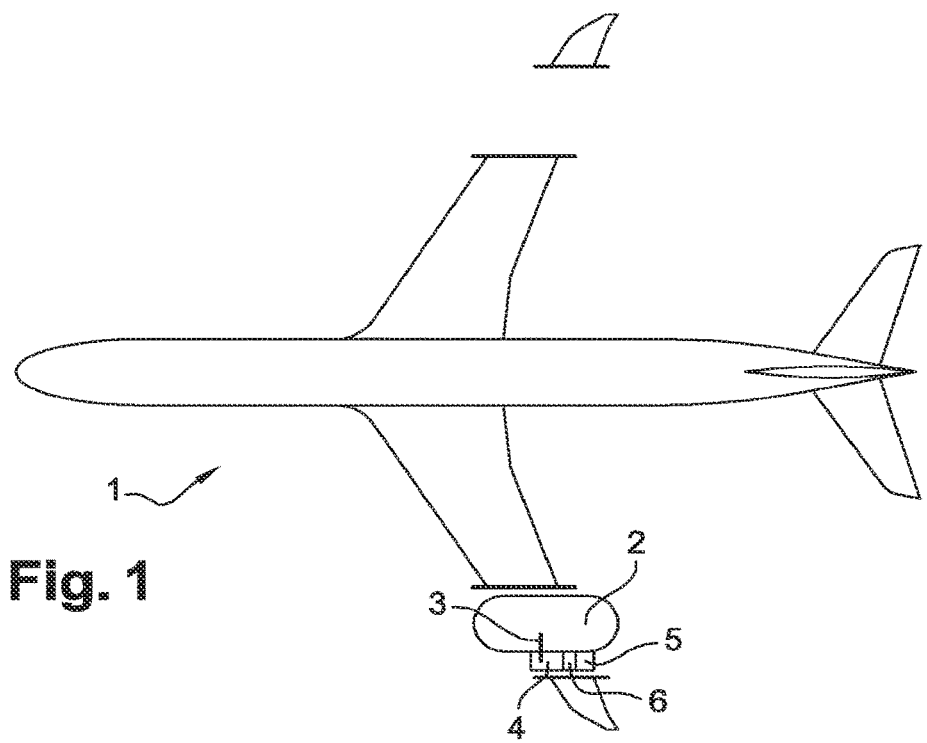
FIG. 1 diagrammatically represents a system in which the invention can be useful.

FIG. 1 represents a system conforming with the invention, in which an aircraft 1 supports an engine 2 such as a turbomachine. The engine 2 comprises a radial power take-off shaft 3, that is output on the side of the engine 2 to extend into a gearbox 4 bolted to the case of the engine 2. The gearbox 4 contains one or several series of gears connected to the radial shaft 3, the shafts of which drive different accessories necessary for operation of the engine 2 and the aircraft 1, such as fuel and lubrication pumps, electrical generators and others. In particular there is a starter, powered by a standalone electrical battery and that makes the engine 2 start by rotating the radial shaft 3. In this case the starter is a reversible electrical machine 5 that acts as an electrical generator after startup. The reversible electrical machine 5 is connected to the gearbox 4 through a reduction gear 6 that is the essential element of the invention and that will be described below; it may form part of the gearbox 4 by remaining contained inside its case, or it may form a physically distinct constituent, without there being any difference in its operation.

Figure 2:
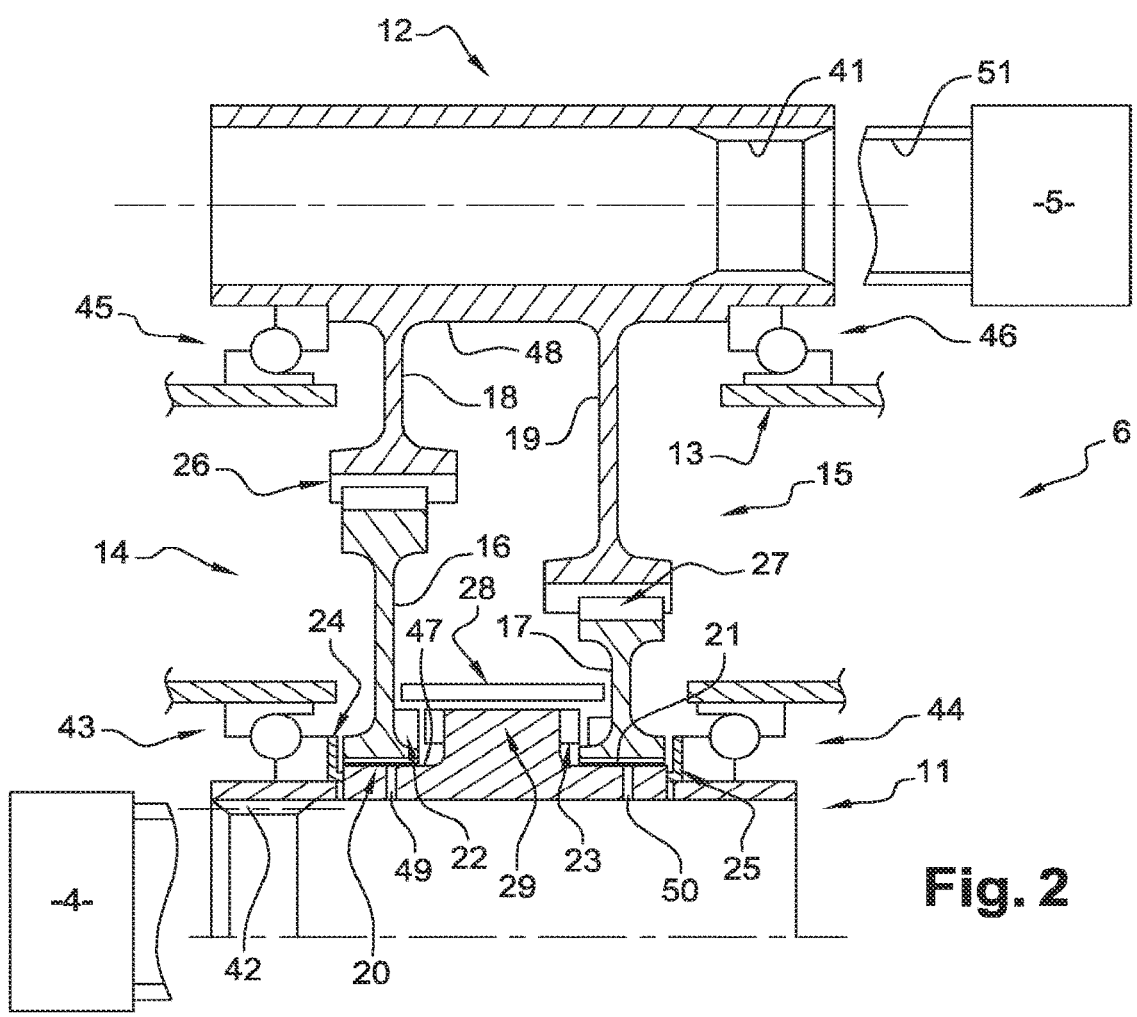
FIG. 2 illustrates one embodiment of the invention.

Refer to FIG. 2. The reduction gear 6 is located between a first shaft 11 and a second parallel shaft 12, both spinning inside a common case 13, only very partly shown herein. The first shaft 11 is located on the side of the engine end 2 and engages with the radial shaft 3 rotating through the gearbox 4, and the second shaft 12 is located on the side of the reversible electrical machine 5, engaging (directly or not) with a rotating shaft 51 of the machine. The shafts 11 and 12 are fitted with splines 41 and 42 respectively, to connect to the remainder of the transmission. Since high axial forces are applied to them, they are supported by the case 13 by means of bearings capable of resisting these forces, such as angular contact ball bearings 43, 44, 45 and 46 (although other bearings can be envisaged). Thickenings 47 and 48 of the first shaft 11 and the second shaft 12 are retained between bearings 43, 44 and 45, 46 respectively.

The transmission of rotation movements between shafts 11 and 12 is made through two gears 14 laid out in parallel, in other words each comprising a first toothed wheel 16 and 17 dependent on the first shaft 11 and a second toothed wheel 18 or 19 dependent on the second shaft 12. The second toothed wheels 18 and 19 are fixed to the second shaft 12, while the first toothed wheels 16 and 17 are mobile toothed wheels free to displace independently along the first shaft 11, under the conditions that will be described below. They are mounted on circular bearings of the first shaft 11 by smooth bearings 20 and 21 and therefore can rotate at rotation speeds different from the speed of said first shaft 11.

Drillings 49 and 50 pass through the first shaft 11 that is hollow to transfer lubrication oil from the smooth bearings 20 and 21 under the action of centrifugal forces; this oil is supplied by a known type of supply device. Other known types of lubrication devices, for example including oil splash nozzles, lubricate the bearings 43, 44, 45, 46 and the teeth 26 and 27.

The mobile toothed wheels 16 and 17 can be genuinely coupled in rotation to the first shaft 11 by dogs 22 and 23 respectively, of which the teeth connected to the first shaft 11 and the teeth connected to the mobile toothed wheels 16 and 17 all project in the axial direction of the first shaft 11: engagement takes place at an axial position of the mobile toothed wheels 16 and 17 along the first shaft 11, at one end of their movement range; an opposite end is determined by an axial stop 24 or 25, fitted with a low friction ring adjacent to the bearings 43 and 44 respectively.

Figure 3:
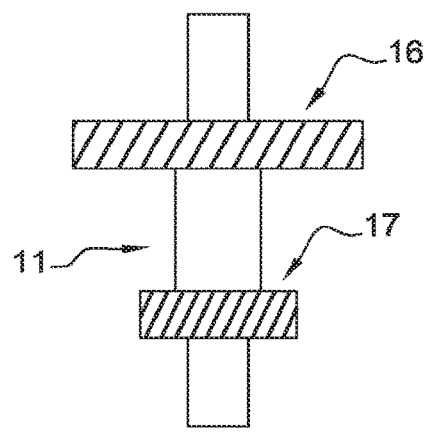
FIG. 3 shows details of the inclination of the helical teeth.

In this embodiment, the dogs 22 and 23 are adjacent to each other and are surrounded by axial stops 24 and 25; the gears 14 and 15 then have teeth 26 and 27 with the same direction of tangential inclination on the first shaft 11, as illustrated on FIG. 3.

The result of this situation is that when a torque is applied to the reduction gear 6, the resultant axial forces passing through the teeth 26 and 27 displace the mobile toothed wheels 16 and 17 along the same axial direction on the first shaft 11, with the effect that one of the dogs 22 and 23 become engaged, while the other is separated. Therefore the power transmission through the reduction gear always takes place through only one of the gears 14 and 15. The direction of inclination of the teeth 26 and 27 is chosen such that, when the reversible electrical machine 5 operates as starter, only the gear (in this case 14) with the largest reduction ratio is active, due to engagement of the dog 22, and transmits movement to the engine 2. But when the reversible electrical machine changes to generator mode, the direction of the applied torque is reversed, which also reverses the direction of the resultant axial forces on the teeth 26 and 27, and displaces the mobile toothed wheels 16 and 17 simultaneously so as to engage the dog 23, separating the dogs 22 from each other and therefore imposing a movement transmission through the gear 15 with the lowest reduction ratio. The mobile toothed wheel 16 or 17 that does not transmit movement is forced into contact with the axial stop 24 or 25.

The widths of the teeth 26 and 27 are comparable to or are larger than the lengths of the axial movement distances of the mobile toothed wheels 16 and 17, so that they always remain engaged. Identical operation of changeovers of the engagement of dogs 22 and 23 would be obtained with dogs 22 and 23 on the same side of the movement paths of the mobile toothed wheels 16 and 17 (for example at the right in FIG. 2, the axial stops 24 and 25 then both being at the left) and inclinations of teeth 26 and 27 in opposite directions along the direction tangential to the first shaft 11.

Therefore this changeover of transmission modes takes place automatically, with no external control. However a risk that needs to be guarded against is accidental coexistence of two dogs 22 and 23, that would then destroy the transmission. This is why there is a spacer 28 free to slide around the first shaft 11, between the mobile toothed wheels 16 and 17, that hold them at a sufficient spacing to guarantee that it is only possible to engage one of the dogs 22 and 23 at a time.

Figure 4:
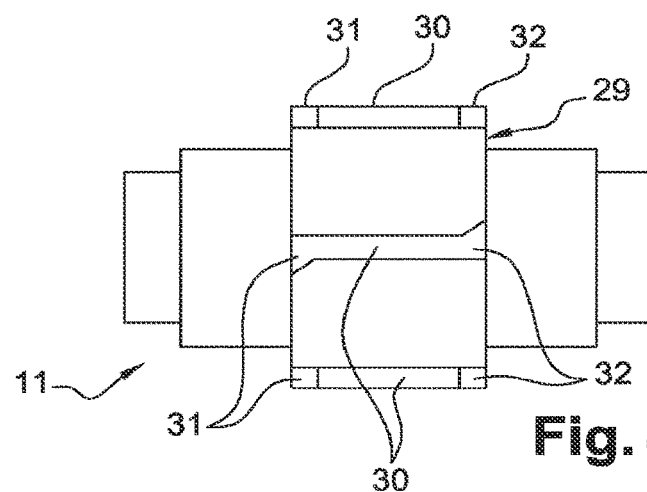
FIG. 4 shows details of the first shaft, la
Figure 5:
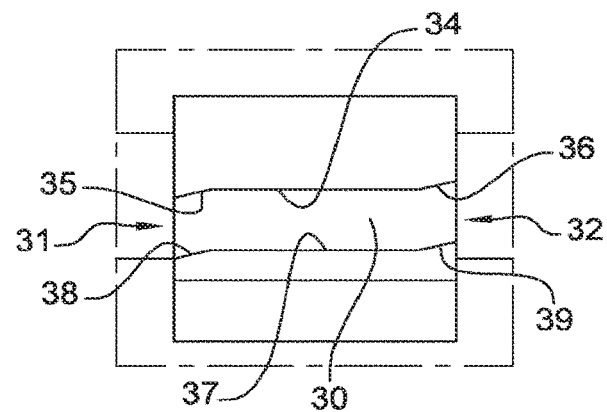
FIG. 5 shows details of the relief of the dog on the first shaft.
Figure 6:
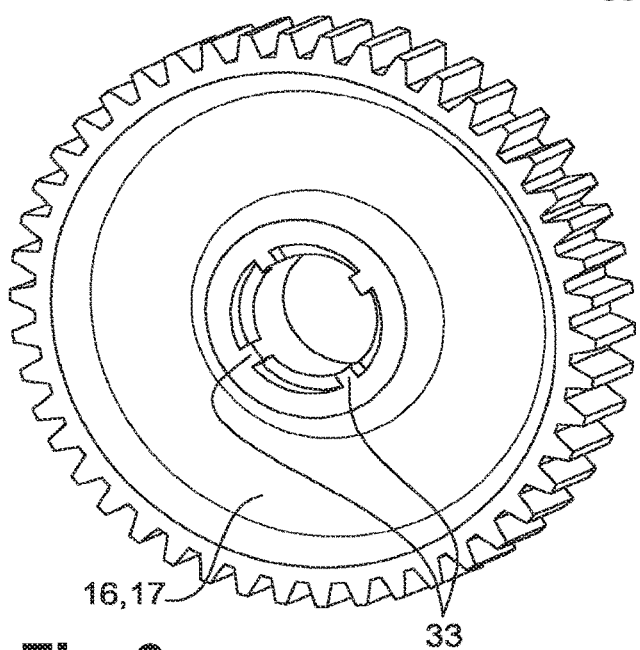
FIG. 6 represents one of the mobile toothed wheels.

Another risk of incorrect operation would be difficulty of changeover, implying either difficult engagement of the dog 22 or 23 concerned, or difficult disengagement. In this case, an arrangement like that shown on FIGS. 4, 5 and 6 is proposed.

The relief on crabs 22 and 23 is then made on a thick central portion 29 of the first shaft 11, by making grooves 30, for example possibly four grooves. End portions 31 and 32 of grooves 30 are active portions that engage the dog with the mobile toothed wheels 16 and 17 respectively, by holding the teeth 33 of the mobile toothed wheels 16 and 17 respectively. The lateral faces of the ends 31 and 32 of the grooves 30 can then be tapered, in other words inclined along the tangential direction relative to the axial direction of the first shaft 11. These inclinations are along the same tangential direction and operation will be as follows.

In one of the modes, power transmission to the teeth 33 takes place through one of the lateral faces 34 of the grooves 30. Since the tapers at the ends 31 and 32 are in the same direction, the taper 35 at the end 31 has the effect of facilitating or maintaining the engagement of the dog 22 and the mobile toothed wheel 16, producing an axial resultant of the interaction forces that displaces the mobile toothed wheel 16 towards the central part 29; the inclination of the taper 36 in the same direction at the opposite end 32 generates an axial resultant along the same direction on the other mobile toothed wheel 17, which therefore has the effect of driving out and breaking the engagement of the crab 23. Similarly, the other lateral face 37 of the grooves 30 has tapers 38 and 39 at end parts 31 and 32 respectively; the taper 38 is used to facilitate separation of the dog 22 and the taper 39 to facilitate engagement of the dog 23, contact between this lateral face 37 and the teeth 33 taking place in the other operating state of the system.

Angular values of the inclination of the tapers 36 and 38 can advantageously be identical because these tapers 36 and 38 perform the same function; the tapers 35 and 39 can have identical inclination values, but can be different from the inclinations of the tapers 36 and 38. Tapers corresponding to inclinations in the tangential direction can be provided on the lateral faces of the teeth 33.

The invention claimed is:

1. A system in an aircraft comprising:
   a reversible electrical machine;
   an engine; and
   a mechanical transmission connecting two rotating shafts belonging to the reversible electrical machine and to the engine respectively, the reversible electrical machine being used both as a starter of the engine and a generator electrically loaded by the engine wherein the mechanical transmission comprises a reduction gear mechanism comprising two gear sets with different tooth reduction ratios, each gear set having a first toothed wheel mounted on a first shaft of the two rotating shafts and a second toothed wheel mounted on a second shaft of the two rotating shafts, the first shaft being an output shaft of the engine and the second shaft being an output shaft of the reversible electrical machine, the first toothed wheels of the two gear sets being mobile toothed wheels free to axially slide on the first shaft and both being provided with mesh relief present on a lateral side of the toothed wheels and capable of engaging with complementary relief on the first shaft at gear positions, the first toothed wheels of the two gear sets being installed free to rotate on the first shaft but fixed in rotation with the first shaft at said gear positions, the first shaft carries a spacer extending between the first toothed wheels of the two gear sets and freely sliding around the first shaft, the spacer can come into contact with the two first toothed wheels simultaneously, keeping the two first toothed wheels at a distance that prevents the gear positions from being present simultaneously, wherein teeth of the first toothed wheels are helical and have inclinations in a same tangential direction relative to the first shaft so that changeovers of the reversible electrical machine from a starter mode to a generator mode and from the generator mode to the starter mode are automatically accompanied with changeovers of a first toothed wheel, among said two first toothed wheels, that is in the gear position, without any external control of axial positions of the first toothed wheels along the first shaft.

2. The system according to claim 1, wherein bearings support the first shaft, and the sliding movements of the first toothed wheels are limited by engagement positions on at a first side of the first shaft closer to the spacer and stops on the first shaft on a second side of the first shaft closer to one of the bearings.

3. The system according to claim 1, wherein the complementary relief on the first shaft is tapered in a tangential direction of the first shaft at least at one end part.

4. The system according to claim 1, wherein the complementary relief on the first shaft includes a groove having first and second lateral faces, a first end of the first lateral face and a second end of the second lateral face each having a taper with the same inclination, and a second end of the first lateral face and a first end of the second lateral face having a taper with the same inclination.

\* \* \* \* \*